United States Patent
Li et al.

(10) Patent No.: US 11,716,016 B2
(45) Date of Patent: *Aug. 1, 2023

(54) POWER MEASUREMENTS IN SWITCHED MODE POWER SUPPLIES

(71) Applicant: Astec International Limited, Kowloon (HK)

(72) Inventors: PengFei Li, ShenZhen (CN); XiaoLin He, ShenZhen (CN); HaiJun Zhang, ShenZhen (CN); XunJiang Dai, ShenZhen (CN); Liang Meng, ShenZhen (CN)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,488

(22) Filed: May 23, 2022

(65) Prior Publication Data

US 2022/0286044 A1 Sep. 8, 2022

Related U.S. Application Data

(63) Continuation of application No. 16/960,353, filed on Jul. 7, 2020, now Pat. No. 11,349,387.

(51) Int. Cl.
*H02M 1/42* (2007.01)
*H02M 1/44* (2007.01)
*H02M 3/24* (2006.01)

(52) U.S. Cl.
CPC .......... *H02M 1/4225* (2013.01); *H02M 1/44* (2013.01); *H02M 3/24* (2013.01)

(58) Field of Classification Search
CPC .... H02M 1/42; H02M 1/4208; H02M 1/4225; H02M 1/44; H02M 7/02
See application file for complete search history.

(56) References Cited

U.S. PATENT DOCUMENTS 5,638,265 A 6/1997 Gabor
5,687,070 A * 11/1997 Jacobs ............... H02M 1/4225
363/126

(Continued)

FOREIGN PATENT DOCUMENTS

CN 101087103 A 12/2007
CN 102347696 B 11/2013

(Continued)

OTHER PUBLICATIONS

International Search Report and Written Opinion for PCT Application No. PCT/CN2020/077276; dated Nov. 26, 2020; 6 pages.

*Primary Examiner* — Gary L Laxton

(57) ABSTRACT

A switched mode power supply (SMPS) includes a filter (202), a power factor correction (PFC) circuit (204), and a control circuit (206, 406) configured to determine various electrical parameters of the SMPS. In some embodiments, the control circuit (206, 406) is configured to determine a power line frequency and an AC input voltage based on an AC line voltage and an AC neural voltage. In other embodiments, the control circuit (206, 406) is configured to determine an AC input current based on a reactive current flowing through the filter (202) and a PFC AC current. In further embodiments, the control circuit (206, 406) is configured to report a value of an electrical parameter if value is determined to be accurate. Other example switch mode power supplies, control circuits and methods are also disclosed.

20 Claims, 10 Drawing Sheets

(56) References Cited

U.S. PATENT DOCUMENTS

| | | |
|---|---|---|
| 6,653,824 B1 | 11/2003 | Whitlock |
| 10,461,628 B1 | 10/2019 | Wang et al. |
| 11,068,005 B2 | 7/2021 | Poon |
| 11,349,387 B2 * | 5/2022 | Dai .................. H02M 1/44 |
| 2013/0057231 A1 | 3/2013 | Luthi et al. |
| 2016/0190912 A1 * | 6/2016 | Lim ............... H02M 1/4225 363/84 |
| 2021/0289602 A1 | 9/2021 | Eberson et al. |

FOREIGN PATENT DOCUMENTS

| | | | |
|---|---|---|---|
| CN | 103887978 | A | 6/2014 |
| CN | 103368372 | B | 4/2016 |
| CN | 105656332 | B | 8/2018 |
| JP | 2011101505 | A | 5/2011 |

\* cited by examiner

POWER MEASUREMENTS IN SWITCHED MODE POWER SUPPLIES

FIELD

The present disclosure relates to power measurements in switched mode power supplies.

BACKGROUND

This section provides background information related to the present disclosure which is not necessarily prior art.

An AC-DC switched mode power supply (SMPS) commonly includes a filter, a power factor correction (PFC) circuit, and a control circuit. The control circuit may calculate an input current, an input voltage, an input power, etc. of the SMPS based on sensed parameters. Typically, the SMPS employs a power-metering chip for measuring input current and input voltage, calculating input power, etc.

SUMMARY

This section provides a general summary of the disclosure, and is not a comprehensive disclosure of its full scope or all of its features.

According to one aspect of the present disclosure, a SMPS includes a line rail, a neutral rail, a filter coupled between the line rail and the neutral rail and having an input for receiving an AC input voltage and an AC input current, an X-capacitance, and an output, a PFC circuit coupled to the output of the filter and having an input for receiving a PFC AC current, and a control circuit coupled to the PFC circuit. The control circuit is configured to generate an analog signal representing a difference between an AC line voltage and an AC neutral voltage, compare the analog signal and a defined threshold to determine zero crossings of the analog signal, determine a frequency of the AC input voltage or the AC input current based on at least two of the zero crossings of the analog signal, determine a reactive current flowing through the X-capacitance in the filter based on the determined frequency, and determine the AC input current of the SMPS based on the determined reactive current and the PFC AC current.

According to another aspect of the present disclosure, a method for determining an AC input current of a SMPS is disclosed. The SMPS includes a line rail, a neutral rail, a filter coupled between the line rail and the neutral rail, and a PFC circuit coupled to the output of the filter. The method includes generating an analog signal representing a difference between an AC line voltage and an AC neutral voltage, comparing the analog signal and a defined threshold to determine zero crossings of the analog signal, determining a frequency of an AC input voltage or an AC input current based on at least two of the zero crossings of the analog signal, determining a reactive current in the filter based on the determined frequency, and determining the AC input current of the SMPS based on the determined reactive current and a PFC AC current.

According to another aspect of the present disclosure, a SMPS includes a line rail, a neutral rail, a filter coupled between the line rail and the neutral rail, and having an input for receiving an AC input voltage and an AC input current, a PFC circuit coupled to the output of the filter, and a control circuit having a differential amplifier and a digital controller. The differential amplifier is configured to generate an analog signal representing a difference between an AC line voltage and an AC neutral voltage. The digital controller is configured to determine the AC input voltage and a frequency of the AC input voltage or the AC input current based on the analog signal.

According to another aspect of the present disclosure, a SMPS includes a filter having an input for receiving an AC input current, an X-capacitance, and an output, a PFC circuit coupled to the output of the filter, and a control circuit coupled to the PFC circuit. The control circuit is configured to determine a value of an AC input electrical parameter of the SMPS, estimate a value of the AC input electrical parameter of the SMPS based on a defined efficiency and an output power of the SMPS, determine an average value of the AC input electrical parameter if a difference between the determined value of the AC input electrical parameter and the estimated value of the AC input electrical parameter is less than a defined tolerance threshold, determine an accuracy of the determined value of the AC input electrical parameter based on the average value of the AC input electrical parameter, and report the determined value of the AC input electrical parameter to an external device if the accuracy of the determined value of the AC input electrical parameter is less than a defined accuracy threshold.

According to another aspect of the present disclosure, a method for reporting an AC input electrical parameter of a SMPS is disclosed. The SMPS includes a filter and a PFC circuit. The method includes determining a value of the AC input electrical parameter of the SMPS, estimating a value of the AC input electrical parameter of the SMPS based on a defined efficiency and an output power of the SMPS, if a difference between the determined value of the AC input electrical parameter and the estimated value of the AC input electrical parameter is less than a defined tolerance threshold, determining an average value of the AC input electrical parameter, determining an accuracy of the determined value of the AC input electrical parameter based on the average value of the AC input electrical parameter, and if the accuracy of the determined value of the AC input electrical parameter is less than a defined accuracy threshold, reporting the determined value of the input electrical parameter to an external device.

According to another aspect of the present disclosure, a SMPS includes a line rail, a neutral rail, a filter coupled between the line rail and the neutral rail, a PFC circuit coupled to the filter, a DC/DC power circuit coupled to the PFC circuit, and a control circuit. The filter includes an input for receiving an AC input voltage and an AC input current, an X-capacitance, and an output. The PFC circuit includes an input for receiving a PFC AC current, at least one power switch, and an output. The DC/DC power circuit includes at least one power switch and a transformer. The control circuit is coupled to the PFC circuit for controlling the at least one power switch of the PFC circuit and to the DC/DC power circuit for controlling the at least one power switch of the DC/DC power circuit. The control circuit includes at least one differential amplifier, a primary side digital controller, a secondary side digital controller, and an isolation device coupled between the primary side digital controller and the secondary side digital controller. The differential amplifier is configured to generate an analog signal representing a difference between an AC line voltage and an AC neutral voltage. The primary side digital controller is configured to determine the AC input voltage based on the analog signal, determine a frequency of the AC input voltage or the AC input current based on the analog signal, determine a reactive current flowing through the X-capacitance based on the determined frequency, and determine the AC input current based on the determined reactive current and the PFC AC current.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding (but not necessarily identical) parts and/or features throughout the several views of the drawings.

DETAILED DESCRIPTION

Figure 1:
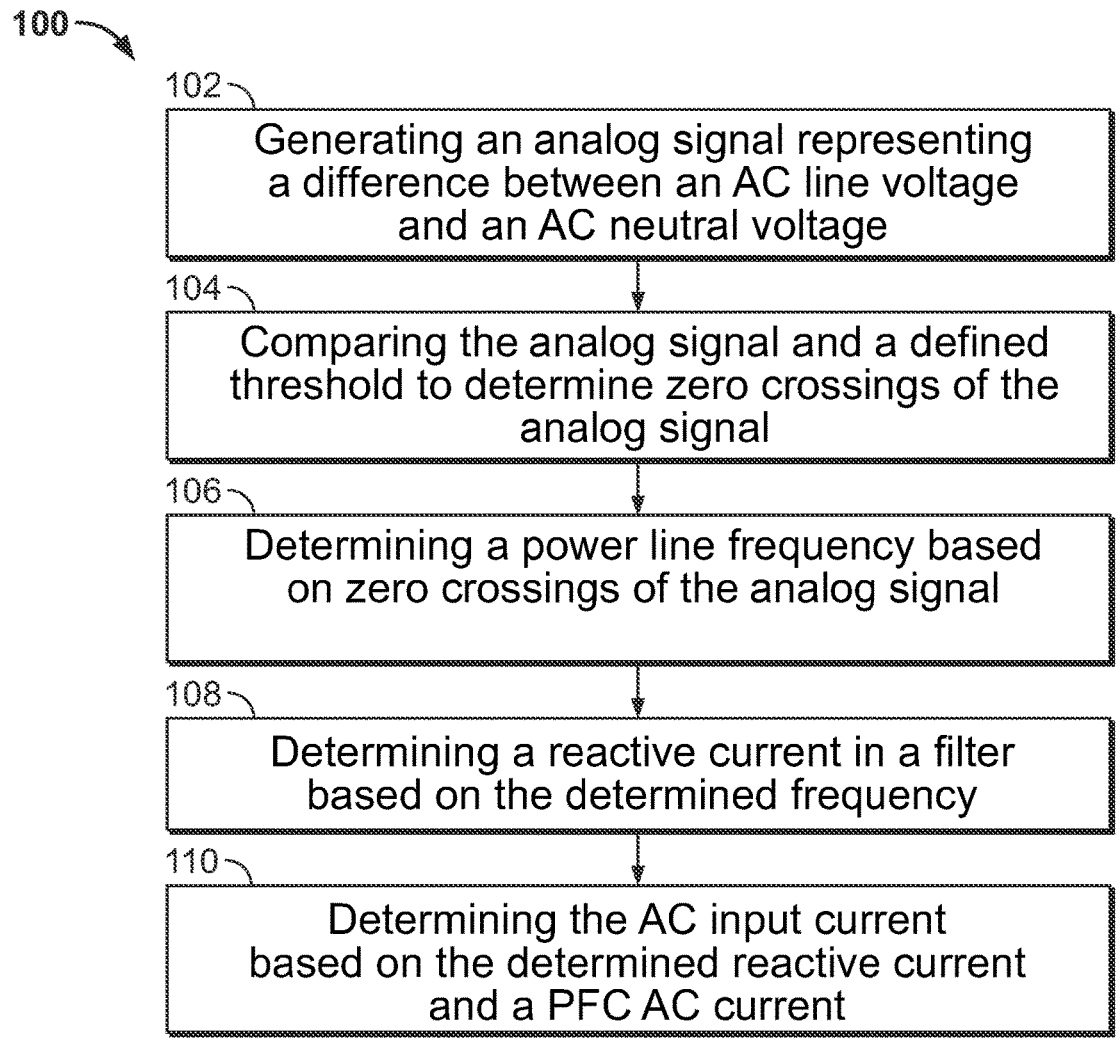
FIG. 1 is a flow diagram of a method for determining an AC input current of a SMPS according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A method for determining an AC input current of a SMPS including a filter and a PFC circuit according to one example embodiment of the present disclosure is illustrated in FIG. 1 and indicated generally by reference number 100. As shown in FIG. 1, the method 100 includes generating an analog signal representing a difference between an AC line voltage and an AC neutral voltage in the SMPS in block 102, comparing the analog signal and a defined threshold to determine zero crossings of the analog signal in block 104, determining a power line frequency (e.g., a frequency of an AC input voltage and/or an AC input current) based on at least two of the zero crossings of the analog signal in block 106, determining a reactive current flowing in the filter based on the determined frequency in block 108, and determining the AC input current of the SMPS based on the determined reactive current and a PFC AC current in block 110.

By identifying zero crossings of the analog signal, the power line frequency of the SMPS may be accurately calculated. This power line frequency is used in determining the AC input current, as further explained below. As such, precisely determining the power line frequency ensures the determined input current is accurate. Because the input current is accurately determined, current sensing devices such as conventional power-metering devices (e.g., power meter chips) used to monitor input parameters such as an AC input current are unnecessary.

Figure 2:
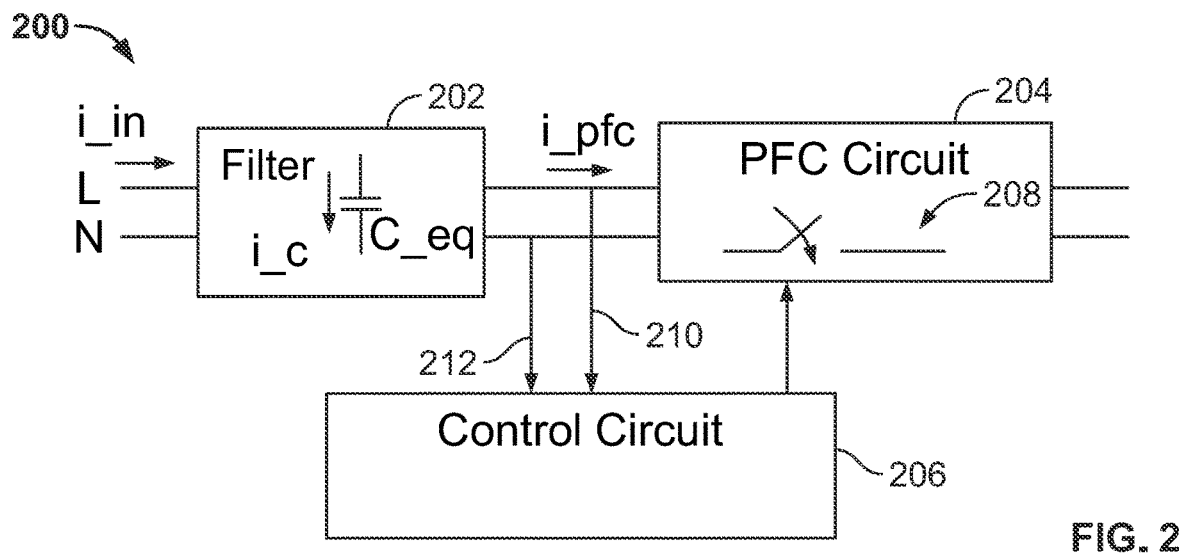
FIG. 2 is a graph illustrating zero crossings of a signal for determining a power line frequency according to another example embodiment.

As explained above, the AC input current is determined based on the PFC AC current and the reactive current. For example, FIG. 2 illustrates a SMPS 200 including a line rail L, a neutral rail N, a filter 202 coupled between the line rail L and the neutral rail N for receiving an AC input current i_in, and a PFC circuit 204 coupled to an output of the filter 202. The filter 202 (e.g., an electromagnetic interference (EMI) filter) includes one or more X-capacitors coupled between the line rail L and the neutral rail N. For purposes of calculations, the one or more X-capacitors may be combined into an equivalent X-capacitance C_eq of the filter 202. These X-capacitors provide a path for a reactive current i_c to flow between the line rail L and the neutral rail N. As such, a current i_pfc provided to the PFC circuit 204 is not necessary equal to the AC input current i_in. Therefore, when determining the AC input current i_in, compensation should be made for the reactive current i_c flowing through the filter's X-capacitors.

Figure 3:
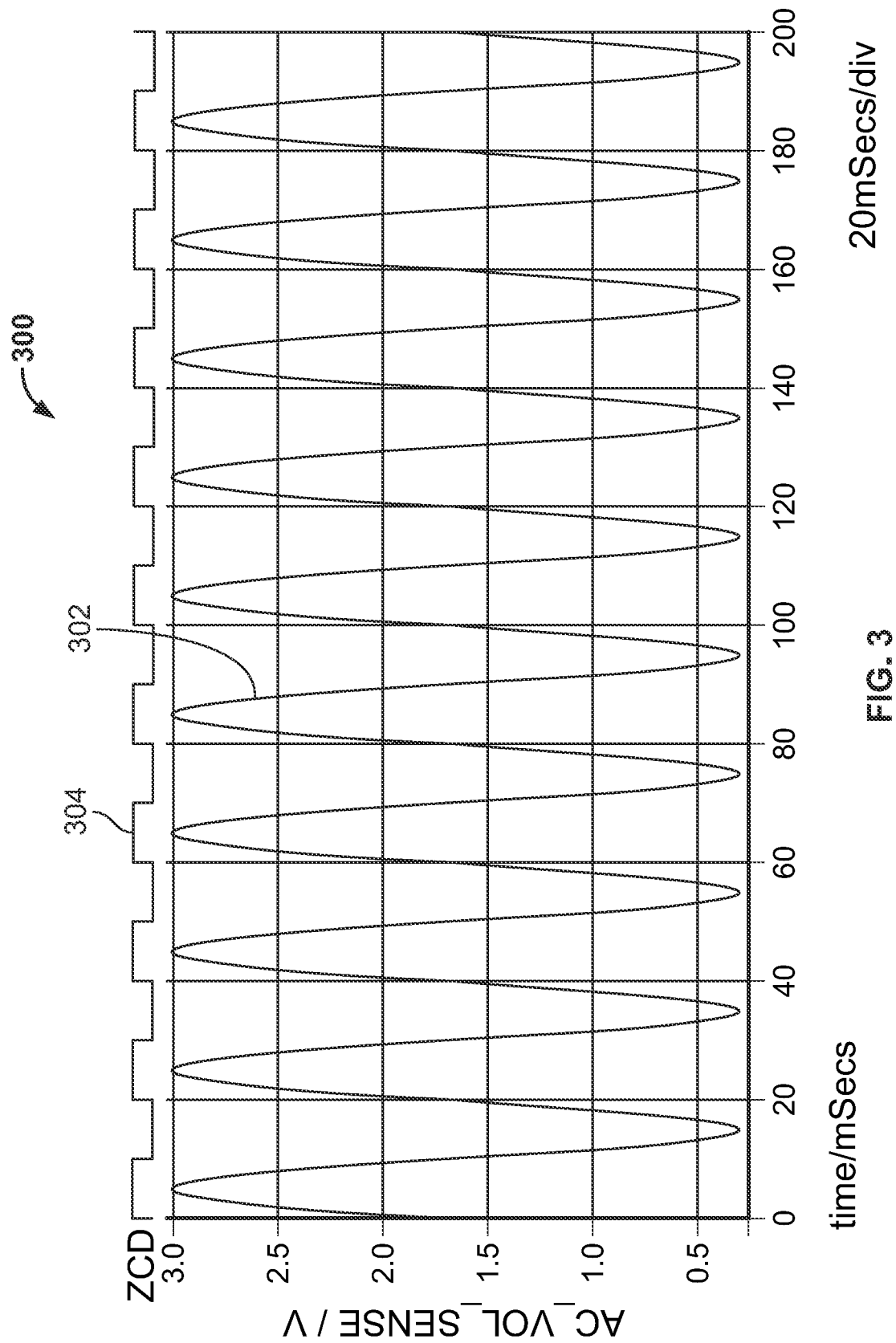
FIG. 3 is a block diagram of a SMPS including a filter, a PFC circuit and a control circuit according to yet another example embodiment.

Referring back to FIG. 1, the power line frequency may be determined based on at least two zero crossings of the analog signal representing a difference between the AC line voltage and the AC neutral voltage. For example, FIG. 3 illustrates a graph 300 including an analog signal 302 and a square wave signal 304. The analog signal 302 represents a difference between the AC line voltage and the AC neutral voltage as explained above. In some examples, the analog signal 302 may be generated with a single differential amplifier, as further explained below.

The square wave signal 304 may be generated based on a comparison between the analog signal 302 and a defined threshold. For example, a comparator may be used to generate the square wave signal 304. In such examples, the comparator may output a high or low signal when the analog signal 302 equals the defined threshold, is greater than the defined threshold, is less than the defined threshold, etc. After which, the comparator may be reset. This creates various rising edges and falling edges of the square wave signal 304.

The defined threshold may be a zero crossing of the analog signal 302. For example, the defined threshold may equal zero. In other examples, the defined threshold may be another suitable positive value if the analog signal is shifted to prevent the signal from falling below zero. This may be necessary if a digital controller (e.g., digital signal processor (DSP)) is used to process the information and calculate the power line frequency. In the particular example of FIG. 3, the analog signal is shifted 1.65 V (e.g., half of the 3.3 DSP voltage), and therefore the defined threshold is 1.65 V.

The rising edges and/or falling edges of the square wave signal 304 may correspond to the zero crossings of the analog signal. For example, in the particular example of FIG. 3, each rising edge and each falling edge of the square wave signal 304 correspond to one zero crossing (e.g., 1.65 V) of the analog signal. In other examples, only the rising edges or only the falling edges may correspond to the zero crossings.

In the example of FIG. 3, the power line frequency may be determined based on two consecutive zero crossings. For example, when two consecutive zero crossings are used to determine the frequency f, a time interval (t) between the two consecutive zero crossing points may be half of the period (T) of main power supply, as shown below in equation (1). Equation (1) may be rearranged into equation (2) to solve for the frequency (f). In equation (2) above, the time interval (t) may be measured, determined, etc. by, for example, an edge interruption mechanism in a control circuit (e.g., any one of the control circuit disclosed herein).

$$t = \frac{1}{2} \times T = \frac{1}{2} \times \frac{1}{f}$$ Equation (1)

$$f = \frac{1}{2 \times t}$$ Equation (2)

In some examples, the power line frequency of a power supply may vary from 47 Hz to 63 Hz. This variation in the frequency may have a large impact on impedances in the power supply, such as on the X-capacitance C_eq of the filter 202 in FIG. 2. For example, the capacitive reactance of the X-capacitance C_eq of FIG. 2 is 1/(2*pi*f*C). This capacitive reactance affects the reactive current i_c. As such, by determining the precise value of the power line frequency (f), the reactive current i_c may be accurately calculated (as further explained below). As a result, the input current i_in may be determined with precision.

Additionally, the power line frequency (f) determination explained above is adaptive to frequency variations. For example, if the unknown power line frequency (f) of the input voltage varies, zero crossings of the analog signal will change accordingly. In turn, the time interval (t) between the two consecutive zero crossing points changes. Thus, even if the power line frequency (f) varies (e.g., between 47 Hz and 63 Hz), the frequency determination scheme explained above may precisely determine the value of the frequency (f).

The determined input current may be used in a variety of ways. For example, the determined input current may be used to calculate other electrical parameters (e.g., input power, etc.) of the SMPS. In such examples, conventional power-metering devices (e.g., power meter chips) that calculate input parameters are unnecessary. Additionally, the determined input current may be periodically, randomly or continuously reported to an external device for monitoring purposes. In other examples, the determined input current may be used for controlling one or more power switches in the PFC circuit and/or other power conversion circuitry in the SMPS. In such examples, the determined input current may be used to increase the power factor of the SMPS.

The above methods for determining an AC input current may be implemented in any suitable control circuit including, for example, any one of the control circuits disclosed herein. For example, and as shown in FIG. 2, the SMPS 200 includes a control circuit 206 coupled to the PFC circuit 204 for controlling at least one power switch 208 in the PFC circuit 204. As shown in FIG. 2, the control circuit 206 receives sensed signals 210, 212 representing the AC line voltage and the AC neutral voltage, respectively. In some examples, the control circuit 206 may generate an analog signal (e.g., the analog signal 302 of FIG. 3) representing a difference between the AC line voltage and the AC neutral voltage, and determine an AC input voltage of the SMPS 200 and/or a power line frequency based on the analog signal. In some instances, the control circuit 206 may compare the analog signal and a defined threshold to determine zero crossings of the analog signal, and then determine the power line frequency based on at least two of the zero crossings of the analog signal. In some examples, the control circuit may determine the reactive current i_c flowing through the X-capacitance C_eq based on the determined frequency, and determine the AC input current of the SMPS 200 based on the determined reactive current i_c and the PFC AC current i_pfc, as explained above.

Figure 4:
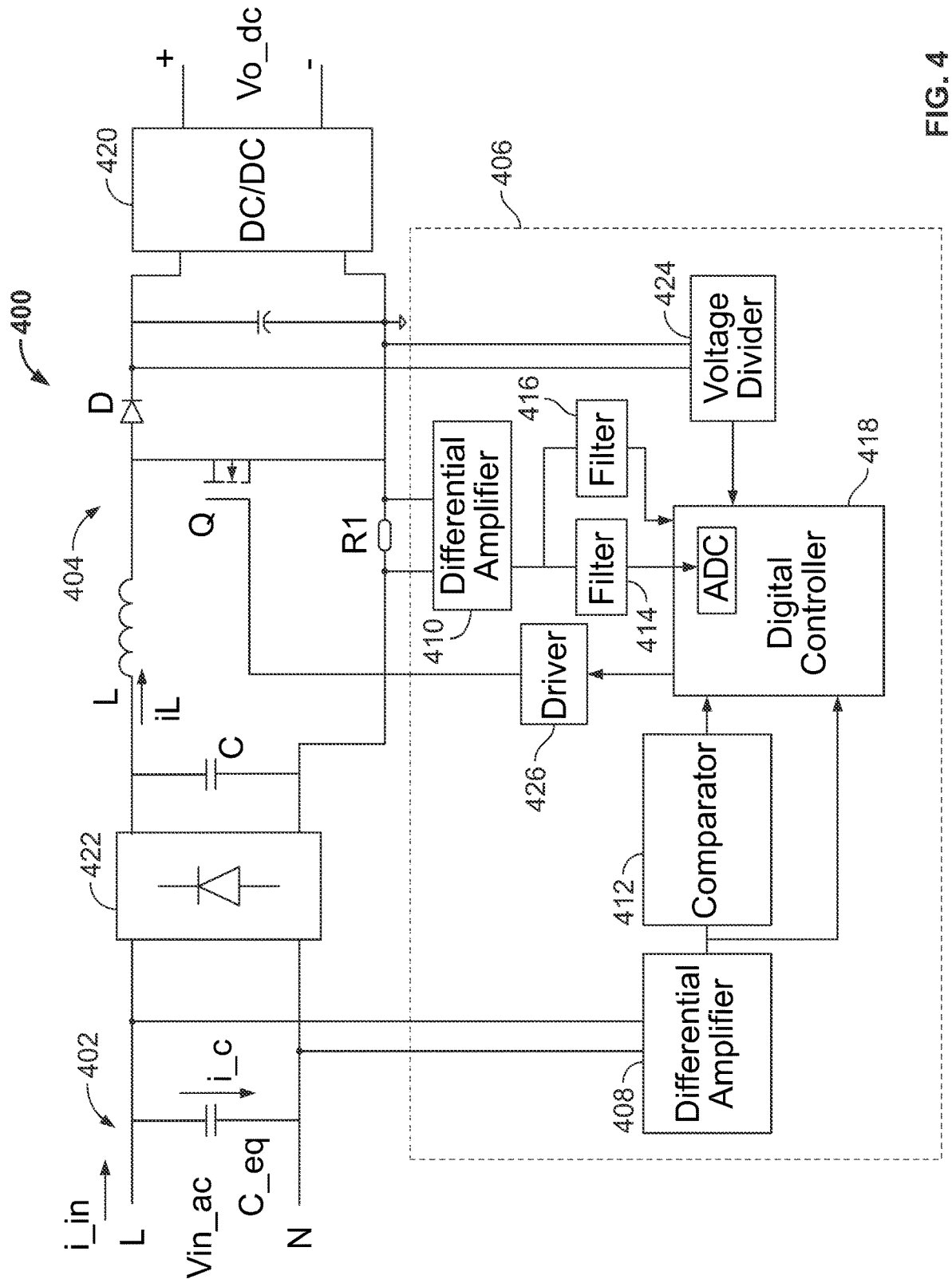
FIG. 4 is a schematic diagram of a SMPS including a filter, a PFC circuit, a DC/DC power converter, and a control circuit according to another example embodiment.

The control circuit 206 may include various components for determining the power line frequency, the AC input voltage, the AC input current i_in, etc. In some examples, the control circuit 206 may include one or more amplifiers, comparators, filters, controllers, etc. for determining the AC input current i_in. For example, FIG. 4 illustrates an AC-DC SMPS 400 including a control circuit 406 having differential amplifiers 408, 410, a comparator 412, filters 414, 416 (e.g., RC filters, etc.) and a digital controller 418 (e.g., a DSP). In other examples, the control circuit 406 may include more or less components than is shown in FIG. 4. The control circuit 406 of FIG. 4 is one example implementation of the control circuit 206 of FIG. 2.

In some examples, the differential amplifier 408 may generate an analog signal representing a difference between an AC line voltage and an AC neutral voltage. In such examples, the digital controller 418 may determine an AC input voltage Vin_ac and a power line frequency (e.g., the frequency of the AC input voltage Vin_ac and/or an AC input current i_in) based on the analog signal. In some examples, the control circuit 406 (e.g., the digital controller 418) may then determine a reactive current i_c, the AC input current i_in, an input power of the SMPS 400, etc.

As shown in FIG. 4, the SMPS 400 further includes a filter 402 and an active PFC circuit 404 coupled to the output of the filter 402. As shown, the filter 402 is represented by an equivalent X-capacitance C_eq coupled across between a line rail L and a neutral rail N. In the particular example of FIG. 4, the PFC circuit 404 has a boost topology. As such, the PFC circuit 404 includes an inductor L, a power switch Q, and a diode D arranged in a boost configuration. As shown, the power switch Q is an N-channel MOSFET. In other examples, another suitable topology and/or suitable switching device may be employed if desired.

The power switch Q of the PFC circuit 404 may be controlled with a PFC current loop control. For example, the control circuit 406 may receive a bulk voltage of the PFC circuit 404 via a voltage divider 424, and an inductor current iL via the differential amplifier 410 and the filter 416. The control circuit 406 may then generate a control signal with a driver 426 for controlling the power switch Q.

Additionally, the SMPS 400 includes a DC/DC power converter 420 (e.g., a DC/DC power circuit) coupled to the output of the PFC circuit 404. The DC/DC power converter 420 may include any suitable converter topology including, for example, a flyback converter, a forward converter (e.g., a two transistor forward converter), a buck converter, a boost converter, a bridge converter (e.g., full bridge, half bridge, etc.), a resonant converter (e.g., an LLC converter, etc.), etc. Additionally, the DC/DC power converter 420 may include an isolated converter topology (e.g., having a transformer), or a non-isolated converter topology. In some examples, the DC/DC power converter 420 may include synchronous rectifiers on the secondary side of an isolation transformer.

Further, the SMPS 400 may include a rectification circuit for rectifying the AC input. For example, and as shown in FIG. 4, the SMPS 400 includes a diode bridge rectifier 422 coupled between the filter 402 and the PFC circuit 404. In some examples, a high frequency filter capacitor C may be coupled between the rectifier 422 and the PRC circuit 404, as shown in FIG. 4. In other embodiments, other suitable rectification circuits may be employed if desired.

The input current i_in may be determined based on the inductor current iL provided to the PFC circuit 404 and the reactive current i_c in the filter 402. The input current i_in is expressed as shown in equation (3) below.

$$i\_in(t) = Iac \times \sin(\omega t) = iL(t) + ic(t) \quad \text{Equation (3)}$$

As shown in FIG. 4, an instantaneous value (e.g., an RMS value) of the inductor current iL may be measured based on a voltage drop across a shunt resistor R1. This voltage drop signal is amplified by the single differential amplifier 410. Next, the amplified signal is fed to a pin of an ADC in the digital controller 418 via the filter 414. In the particular example of FIG. 4, the differential amplifier 410 includes an offset. For example, the differential amplifier 410 may include a voltage divider for shifting (e.g., offsetting) the amplifier's output to ensure the output is positive.

In such examples, the inductor current iL may be determined based on a voltage (ViL.ADC) sampled by the ADC (e.g., the ADC counter value), and provided by the differential amplifier 410. For example, the value of the ADC after converting the output of the differential amplifier 410 may be determined using equation (4) below.

$$ViL.ADC = (R1 \times iL \times Gi + Voffset) \times ADCi \quad \text{Equation (4)}$$

In equation (4), R1 is the value of the shunt resistor, Gi is the gain of the differential amplifier 410, Voffset is the offset in the differential amplifier 410 as explained above, and ADCi is the ADC's interrupt bit. The interrupt bit ADCi may be expressed as equation (5) below, where N is the number of bits of the ADC, and Vref is the reference voltage provided to the ADC.

$$ADCi = \frac{2^N}{Vref} \quad \text{Equation (5)}$$

The inductor current iL may be calculated by rearranging equation (3), as shown below in equation (6).

$$iL = ViL.ADC \times \frac{Vref}{2^N} \times \frac{1}{R1 \times Gi} - \frac{Voffset}{R1 \times Gi} \quad \text{Equation (6)}$$

In equation (6), values of the Vref, N, R1, Gi and Voffset are known based on the design of the SMPS 400. In such examples, if the ADC is a 12 bit ADC (as is typical), the reference voltage Vref is 2.5V, and Voffset/(R1×Gi) equals Ioffset, equation (6) may be simplified to equation (7) below.

$$iL = ViL.ADC \times \frac{2.5}{2^{12}} \times \frac{1}{R1 \times Gi} - Ioffset \qquad \text{Equation (7)}$$

Equation (7) may be further simplified into equation (8) below. In equation (8), Ki equals 2.5/2^12*1/Rs*Gi, A equals ViL.ADC, and B equals Ioffset. In such examples, the inductor current iL can be derived once the ADC counter value ViL.ADC is obtained by the digital controller 418.

$$iL = Ki \times A - B \qquad \text{Equation (8)}$$

The reactive current i_c may be determined based on the equivalent X-capacitance C_eq, as shown in equation (9) below.

$$i\_c(t) = C\_eq \times \frac{dVc(t)}{dt} \qquad \text{Equation (9)}$$

In equation (9), Vc is the voltage across the equivalent X-capacitance C_eq, and is determined based on equation (10) below. In equation (10), Vac(t) is the AC main input voltage, Vac is a measured value of the AC input voltage, and w equals 2×π(pi)×f (frequency).

$$Vc(t) = Vac(t) = Vac \times \sin(\omega t) \qquad \text{Equation (10)}$$

When equations (7) and (8) are combined, the reactive current i_c may be expressed as equation (11) below.

$$i\_c(t) = C\_eq \times Vac \times \omega \times \cos(\omega t) \qquad \text{Equation (11)}$$

Figure 5:
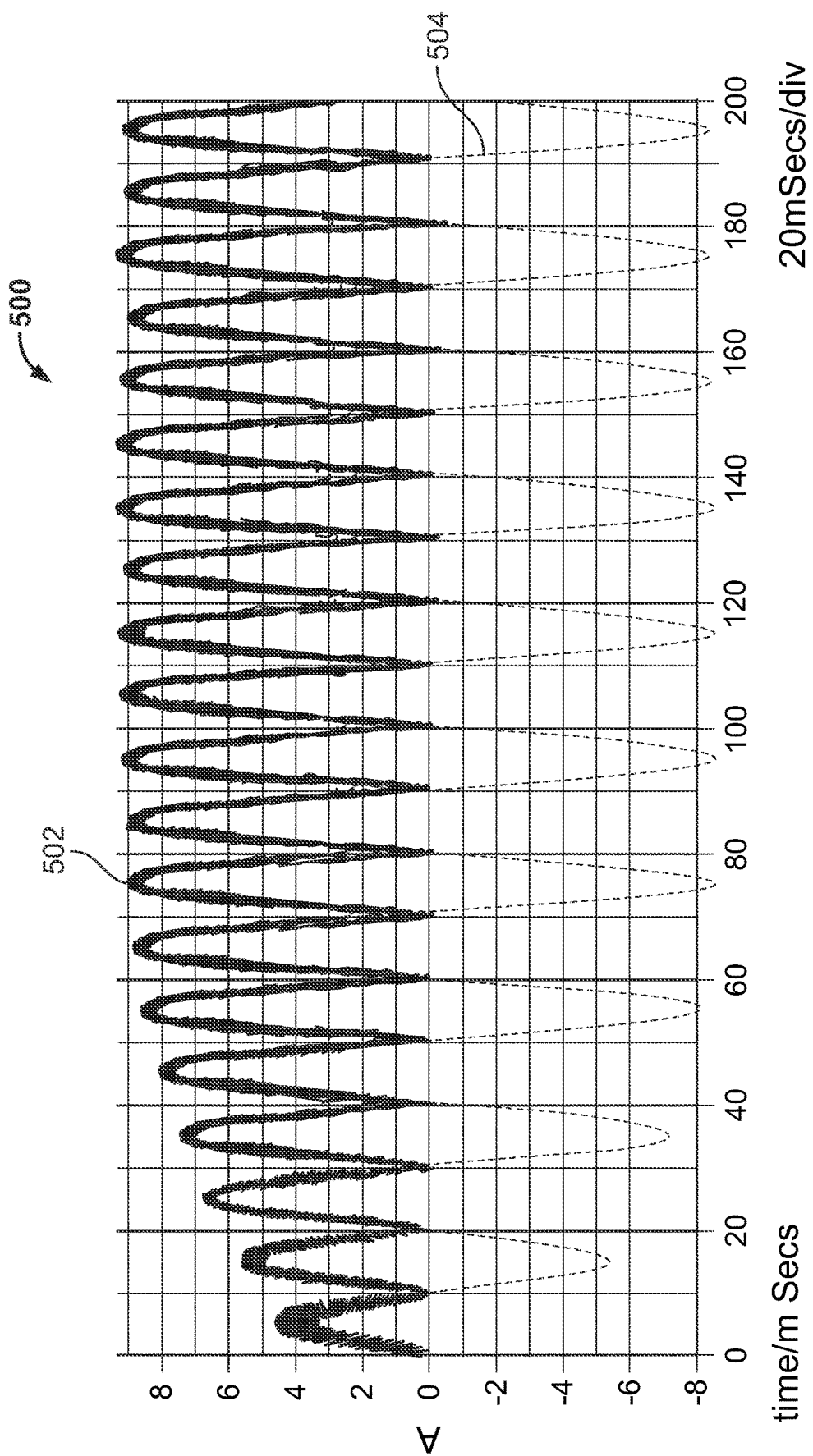
FIG. 5 is a graph illustrating waveforms of an inductor current and an input current of the SMPS of FIG. 4, according to yet another example embodiment.
Figure 6:
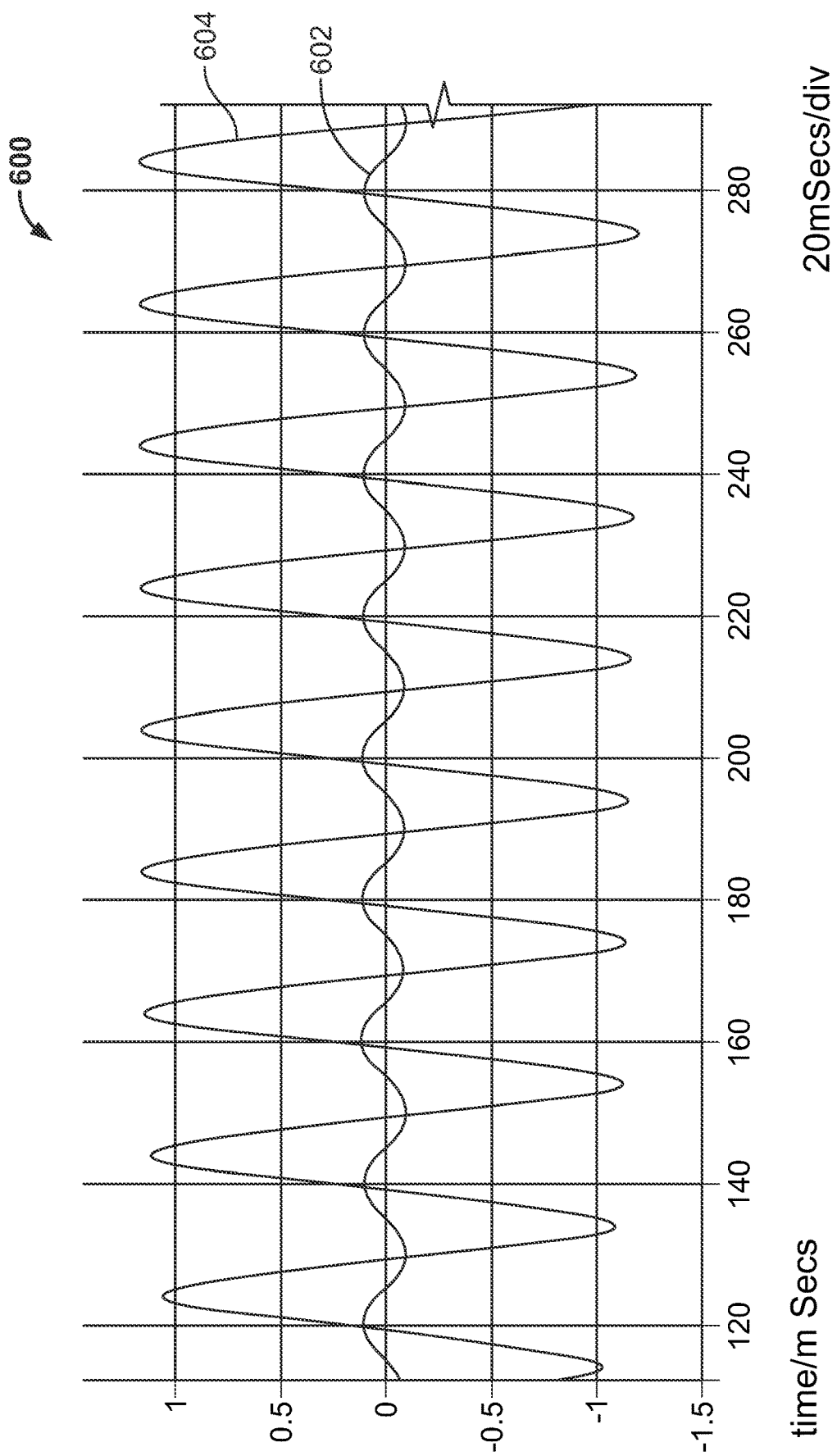
FIG. 6 is a graph illustrating waveforms of a reactive current and an input current of the SMPS of FIG. 4, according to another example embodiment.

For example, FIGS. 5 and 6 illustrate graphs 500, 600 including various waveforms of simulated current in the SMPS 400. Specifically, the graph 500 of FIG. 5 includes a current waveform 502 representing the inductor current iL(t), and a current waveform 504 representing the input current i_in(t). The graph 600 of FIG. 6 includes a current waveform 602 representing the reactive current i_c(t), and a current waveform 604 representing the input current i_in(t).

The graph 600 shows the impact of the reactive current i_c at a light load. For example, at a light load (e.g., 20% load and below, etc.), the input current i_in(t) (waveform 604) and the inductor current iL(t) (e.g. the PFC current) are small. As such, the reactive current i_c(t) (waveform 602) may have a larger impact on the input current i_in(t) than as compared to a larger load, a full load, etc. Thus, if the reactive current i_c(t) cannot be accurately calculated at, for example, a light load, the input current i_in(t) (determined based on the reactive current) may not meet desired accuracy standards.

Referring back to FIG. 4, the control circuit 406 uses the single differential amplifier 408 to determine the AC main input voltage and the frequency (f). For example, and as shown in FIG. 4, the differential amplifier 408 generates an analog signal representing a difference between the AC line voltage and the AC neutral voltage, as explained herein. This analog signal is provided to the digital controller 418 for obtaining the AC main input voltage. For example, an instantaneous value (e.g., an RMS value) of the AC main input voltage Vac may be determined based on equation (12) below.

$$Vac.ADC = \left( \left( Vac \times \frac{R2}{R1+R2} \right) + Z \right) \times \frac{2^N}{Vref} \qquad \text{Equation (12)}$$

In equation (12), Vac.ADC represent a voltage (e.g., the analog signal) sampled by the ADC and provided by the differential amplifier 408, R2/(R1+R2) represents a voltage divider for scaling down the main voltage to an acceptable voltage level for the digital controller 418, N is the number of bits of the ADC, and Vref is the reference voltage provided to the ADC. Additionally, Z represents a voltage shift (e.g., 1.25V) to accommodate the ADC voltage range (e.g., 2.5V).

The control circuit 406 may determine the frequency (f) when obtaining the AC main input voltage. For example, and as shown in FIG. 4, the analog signal generated by the differential amplifier 408 is provided to the comparator 412. The comparator 412 compares the analog signal (e.g., the analog signal 302 of FIG. 3) to a defined threshold, and generates a square wave signal (e.g., the square wave signal 304 of FIG. 3) for the digital controller 418 based on the comparison, as explained above. The defined threshold is selected to ensure rising edges and/or falling edges of the square wave signal correspond to the zero crossings of the analog signal (and therefore the AC main input voltage). The ADC in the digital controller 418 then calculates the power line frequency (f) based on the rising edges and falling edges (zero crossings) of the analog signal, as explained above.

By developing the analog signal (the AC main input voltage) with the single differential amplifier 408 and determining precise zero crossings with the comparator 412, the power line frequency (f) may be accurately calculated. For example, and as explained herein, the frequency (f) is determined based on zero crossing points of the analog signal (a single waveform) generated by the differential amplifier 408. In contrast, conventional approaches determined frequency based on multiple waveforms. Specifically, conventional approaches determined zero crossing points of a line voltage signal and zero crossing points of a neutral voltage signal, and then determined the frequency based on both sets of zero crossing points. As such, any delay between when the line voltage signal and the neutral voltage signal crosses zero may cause inaccuracies in the determined frequency. However, in the present disclosure, the power line frequency (f) may be accurately determined without this delay. In turn, the precise power line frequency (f) may be used to accurately determine the reactive current i_c, as explained above.

Additionally, in the particular example of FIG. 4, the AC main input voltage and the frequency (f) are determined by using the single differential amplifier 408 (e.g., a high impedance differential amplifier). In such examples, only one port of the ADC in the digital controller 418 may be required to obtain the frequency (f) as compared to traditional control schemes that measure the AC line voltage and the AC neutral voltage, and require two or more ADC ports.

In some embodiments, the control circuit 406 may determine the input power provided to the SMPS 400. For example, the digital controller 418 may determine an input power Pin of the SMPS 400 based on the analog signal and the AC input current. More specifically, the digital controller 418 may calculate the input power Pin by multiplying an RMS value of the AC main input voltage Vac calculated in equation (12) above, and an RMS value of the AC input current i_in calculated in equation (3) above. In such examples, the power factor is assumed to be a value near unity (1), such as 0.99.

Figure 7:
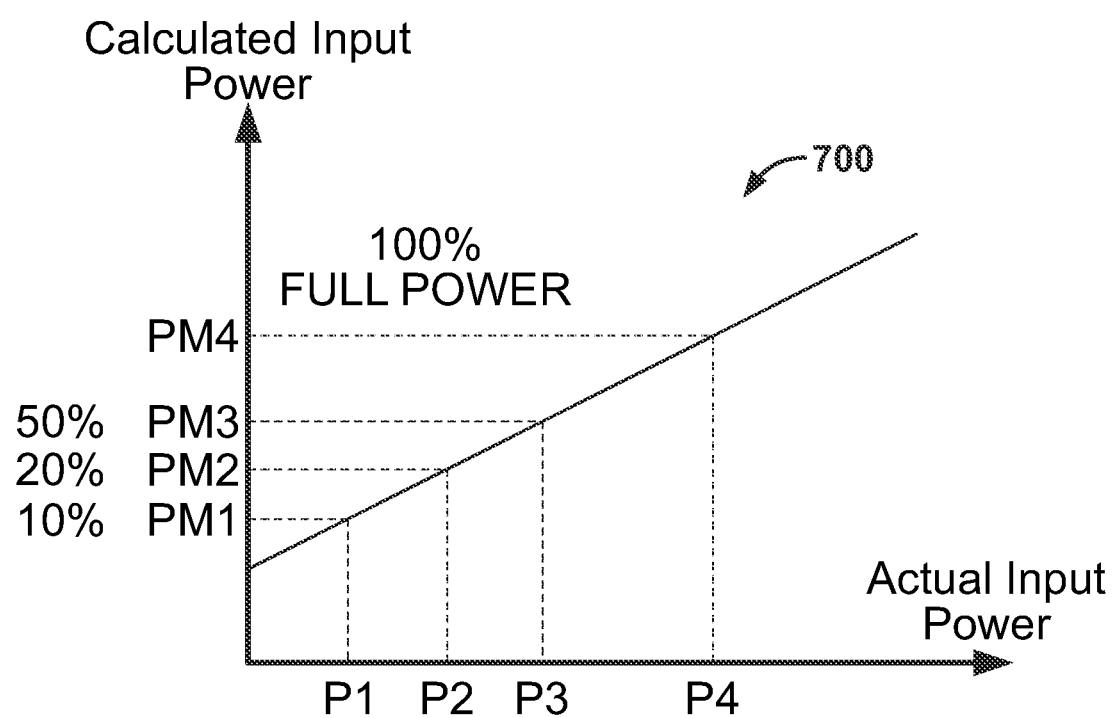
FIG. 7 is a graph illustrating calculated input power values and actual input power values of a SMPS for determining offset errors and gain errors of an analog-to-digital converter (ADC) in the control circuit of FIG. 4, according to yet another example embodiment.

The calculated input power Pin may be used to calibrate the SMPS 400 based on the actual input power. For example, FIG. 7 illustrates a graph 700 including multiple values PM1-4 of the calculated input power Pin and multiple values P1-4 of the actual input power at different loads. Specifically, the values PM1, P1 correspond to a 10% load, the values PM2, P2 correspond to a 20% load, the values PM3, P3 correspond to a 50% load (half load), and the values PM4, P4 correspond to a 100% load (full load).

Based on the points of intersection between each corresponding calculated value and actual value, offset errors and gain errors of the ADC in the digital controller 418 may be determined at various loads. For example, the offset error and the gain error may be calculated based on the values PM1-4, P1-4 corresponding to the 10% load, the 20% load, the 50% load, and the 100% load. For instance, equations (13) and (14) below may be used to determine the offset error and the gain error, respectively, between the 10% load and the 20% load.

$$OffsetError_{10\%-20\%} = \frac{(P1 \times PM1) - (P2 \times PM1)}{P1 - P2} \quad \text{Equation (13)}$$

$$GainError_{10\%-20\%} = \left|\left(\frac{P1 - P2}{PM1 - PM2}\right) - 1\right| \quad \text{Equation (14)}$$

Additionally, equations (15) and (16) below may be used to determine the offset error and the gain error, respectively, between the 50% load and the 100% load.

$$OffsetError_{50\%-100\%} = \frac{(P3 \times PM4) - (P4 \times PM3)}{P3 - P4} \quad \text{Equation (15)}$$

$$GainError_{50\%-100\%} = \left|\left(\frac{P3 - P4}{PM3 - PM4}\right) - 1\right| \quad \text{Equation (16)}$$

The offset error and the gain error calculations may also be applicable to output power of the SMPS 400. For example, a calculated output power of the SMPS 400 may be used to calibrate the SMPS 400 based on the actual output power. In such examples, equations similar to equations (13)-(16) may be employed to determine the offset error and the gain error at various loads.

Figure 8:
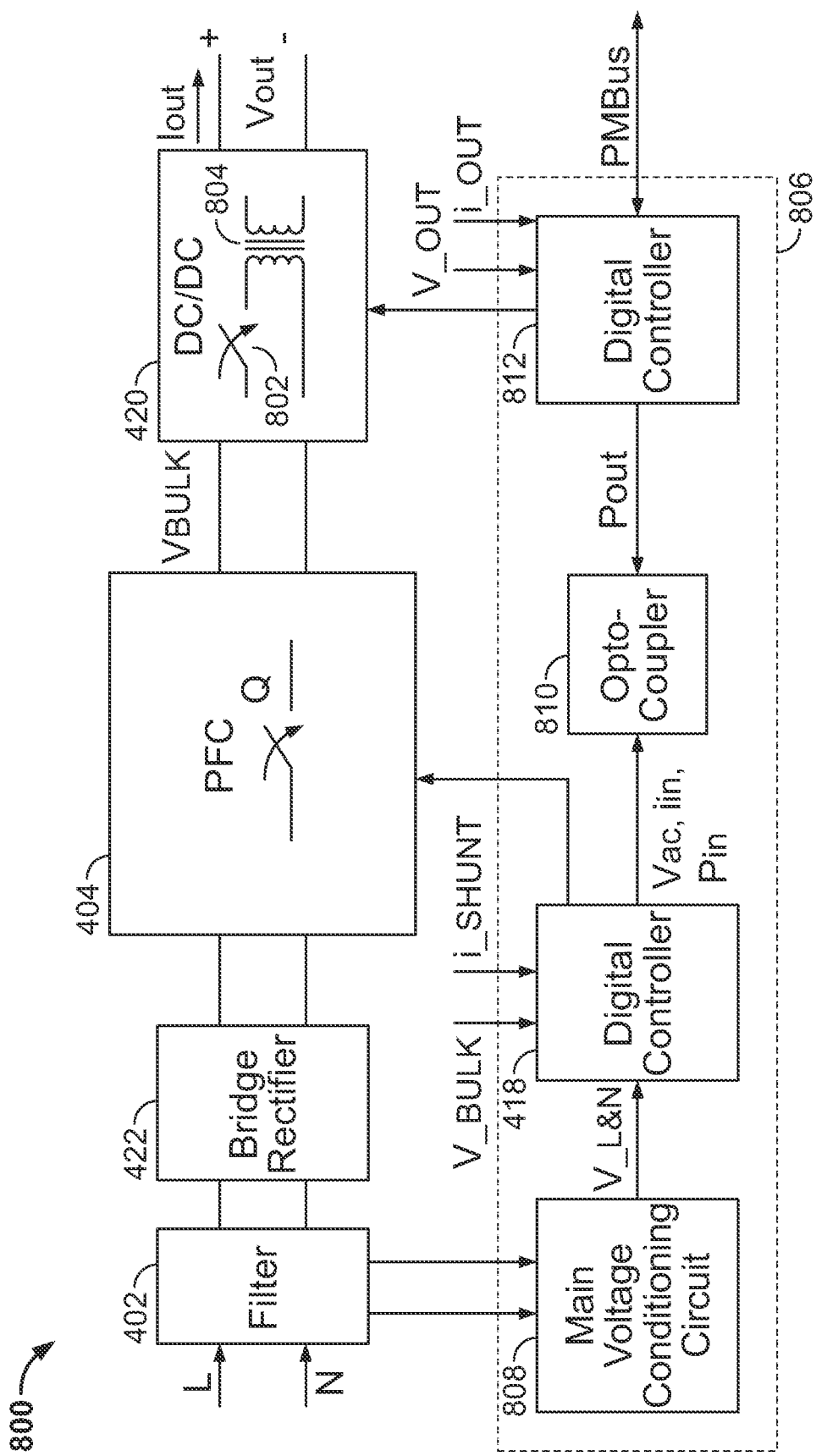
FIG. 8 is a block diagram of a SMPS including a filter, a bridge rectifier, a PFC circuit, a DC/DC power converter, and a control circuit according to another example embodiment.

In some examples, the control circuits disclosed herein may report one or more electrical parameters to an external device. For example, FIG. 8 illustrates an AC-DC SMPS 800 including a control circuit 806 having an interface for communicating with an external device. In the particular example of FIG. 8, the interface includes a power management bus (PMBus). In other examples, the interface may additionally and/or alternatively include an I-squared-C bus, a universal serial bus (USB), a wire, a connector, a terminal, etc.

As shown in FIG. 8, the SMPS 800 includes the filter 402, the bridge rectifier 422, the PFC circuit 404, and the DC/DC power converter 420 of FIG. 4. For example, the DC/DC power converter 420 may include at least one power switch 802 and a transformer 804 coupled to the power switch 802. Although the power switch 802 is shown coupled along a high DC rail and to a primary winding of the transformer 804, it should be apparent to those skilled in the art that the power switch 802 and/or the transformer 804 may be coupled in another suitable manner depending on, for example, the topology of the DC/DC power converter 420.

The control circuit 806 of FIG. 8 is similar to the control circuit 406 of FIG. 4, but includes additional components for controlling the power switch 802 of the DC/DC power converter 420 along with the power switch Q of the PFC circuit 404. For example, the control circuit 806 includes a main voltage conditioning circuit 808, the digital controller 418 of FIG. 4 (e.g., a primary side digital controller), a secondary side digital controller 812, and an opto-coupler 810 coupled between the primary side digital controller 418 and the secondary side digital controller 812. The main voltage conditioning circuit 808 may include a differential amplifier (e.g., the differential amplifier 408 of FIG. 4), a comparator (e.g., the comparator 412 of FIG. 4), etc. for developing a signal based on the line and neutral voltages and the power line frequency, as explained above. Additionally, the digital controller 418 may determine the power line frequency, a reactive current in the filter 402, an AC input current Iin of the SMPS 800, an AC main voltage Vac, an input power Pin, etc., as explained above.

The digital controller 812 controls one or more power switches in the DC/DC power converter 420. For example, the digital controller 812 receives signals representing an output voltage Vout and an output current Iout of the DC/DC power converter 420, and then generates one or more control signals based on the received signals for controlling the power switch(es) in the DC/DC power converter 420.

Additionally, the digital controller 812 may calculate an output power Pout of the SMPS 800 if desired. In some examples, and as shown in FIG. 8, the control circuit 806 may pass the calculated output power Pout from the secondary side digital controller 812 to the primary side digital controller 418. In such examples, the primary side digital controller 418 may use the output power Pout to estimate the input power Pin (as further explained below), control the power switch Q in the PFC circuit, etc. In other examples, secondary side digital controller 812 may estimate the input power Pin if desired.

The opto-coupler 810 provides isolation in the control circuit 806 between primary side control components and secondary side control components. As shown, signals representing input parameters (e.g., the AC main voltage Vac, the AC input current Iin, the input power Pin, etc.) may be passed from the primary side controller 418 to the secondary side digital controller 812 via the opto-coupler 810, and signals representing output parameters (the output power Pout, etc.) may be passed from the secondary side controller 812 to the primary side digital controller 418 via the opto-coupler 810. In some examples, the input and output parameters may be passed through the opto-coupler 810 via a universal asynchronous receiver-transmitter (UART).

One or more of the input and output parameters may be reported to the external device via the communication interface. For example, in the particular example of FIG. 8, one or more of the AC main voltage Vac, the AC input current Iin, the input power Pin, the output voltage Vout, the output current Iout, the output power Pout, etc. may be sent by the secondary side digital controller 812 to the external device via the PMBus. This allows a user to review and confirm the input and output parameters of the SMPS 800 are at desired levels, and confirm the accuracy of calculated values of the parameters. In other examples, the primary side digital controller 418 may report any one or more of the input and output parameters to the external device via a communication interface.

Figure 9:
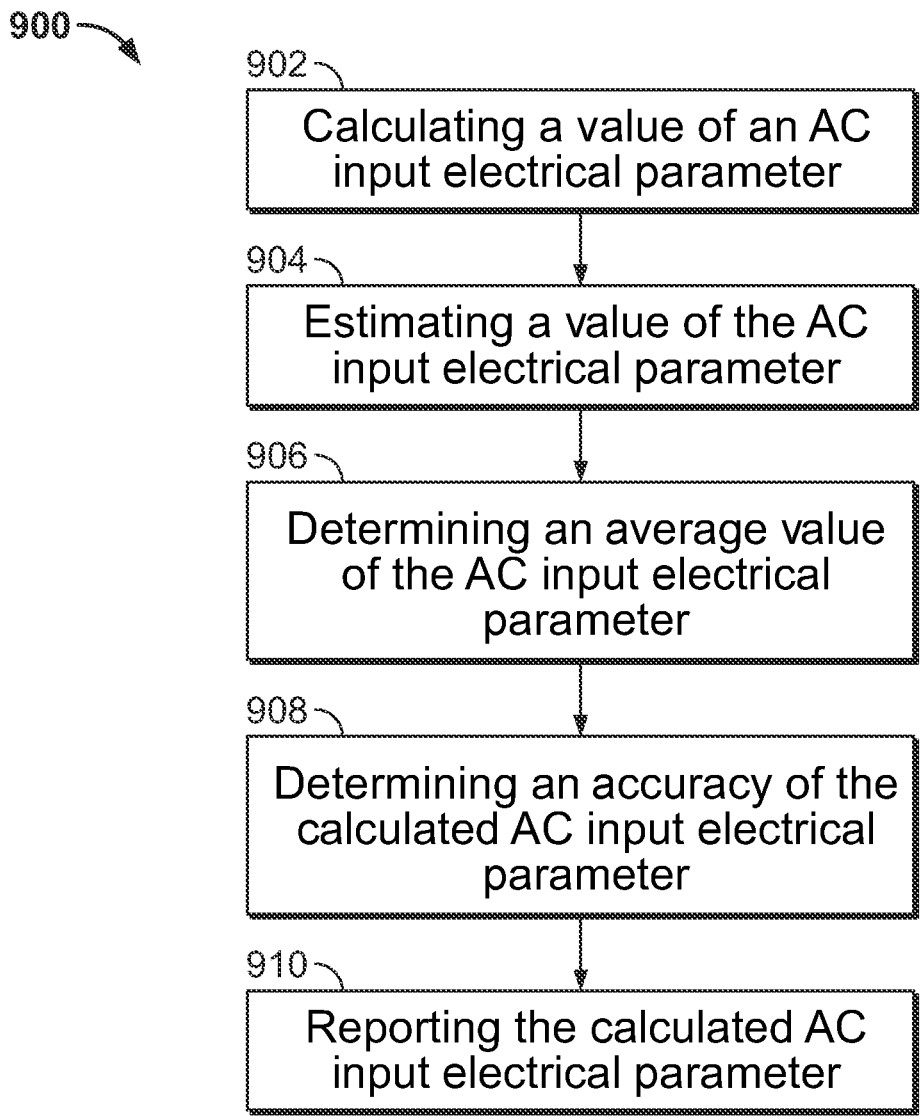
FIG. 9 is a flow diagram of a method for reporting an AC input electrical parameter of a SMPS according to yet another example embodiment.

In other embodiments, it may be desirable to report calculated values of one or more electrical parameters depending on the accuracy of the calculated value. For example, FIG. 9 illustrates a method 900 for reporting an AC input electrical parameter of a SMPS including a filter and a PFC circuit. As shown in FIG. 9, the method 900 includes calculating a value of the AC input electrical parameter of the SMPS in block 902. For example, and as further explained below, the AC input electrical parameter may be determined based on, e.g., a reactive current in the filter, a PFC input current, etc.

The method 900 further includes estimating a value of the AC input electrical parameter of the SMPS in block 904. The estimated value of the AC input electrical parameter may be determined based on known characteristics such as the efficiency, the output power, etc. of the SMPS.

Additionally, the method 900 includes determining an average value of the calculated AC input electrical parameter in block 906. For example, the AC input electrical parameter may be averaged over a number of samples for a number of AC cycles. Averaging the calculated AC input electrical parameter may increase the accuracy of the electrical parameter. In some examples, this step is performed if a difference between the calculated value of the AC input electrical parameter and the estimated value of the AC input electrical parameter is less than a defined tolerance threshold.

The method 900 further includes determining an accuracy of the calculated value of the AC input electrical parameter in block 908, and reporting the calculated value of the input electrical parameter to an external device in block 910. The accuracy of the calculated AC input electrical parameter may be based on, for example, the average value of the AC input electrical parameter. Additionally, in some examples the calculated value of the input electrical parameter is reported if the accuracy of the calculated value of the AC input electrical parameter is less than a defined accuracy threshold.

The AC input electrical parameter of FIG. 9 may be any suitable electrical parameter in the SMPS such as the AC input current, the input power, etc. of the SMPS. For example, FIG. 10 illustrates a method 1000 for calibrating (or recalibrating) and reporting the input power of the SMPS.

Figure 10:
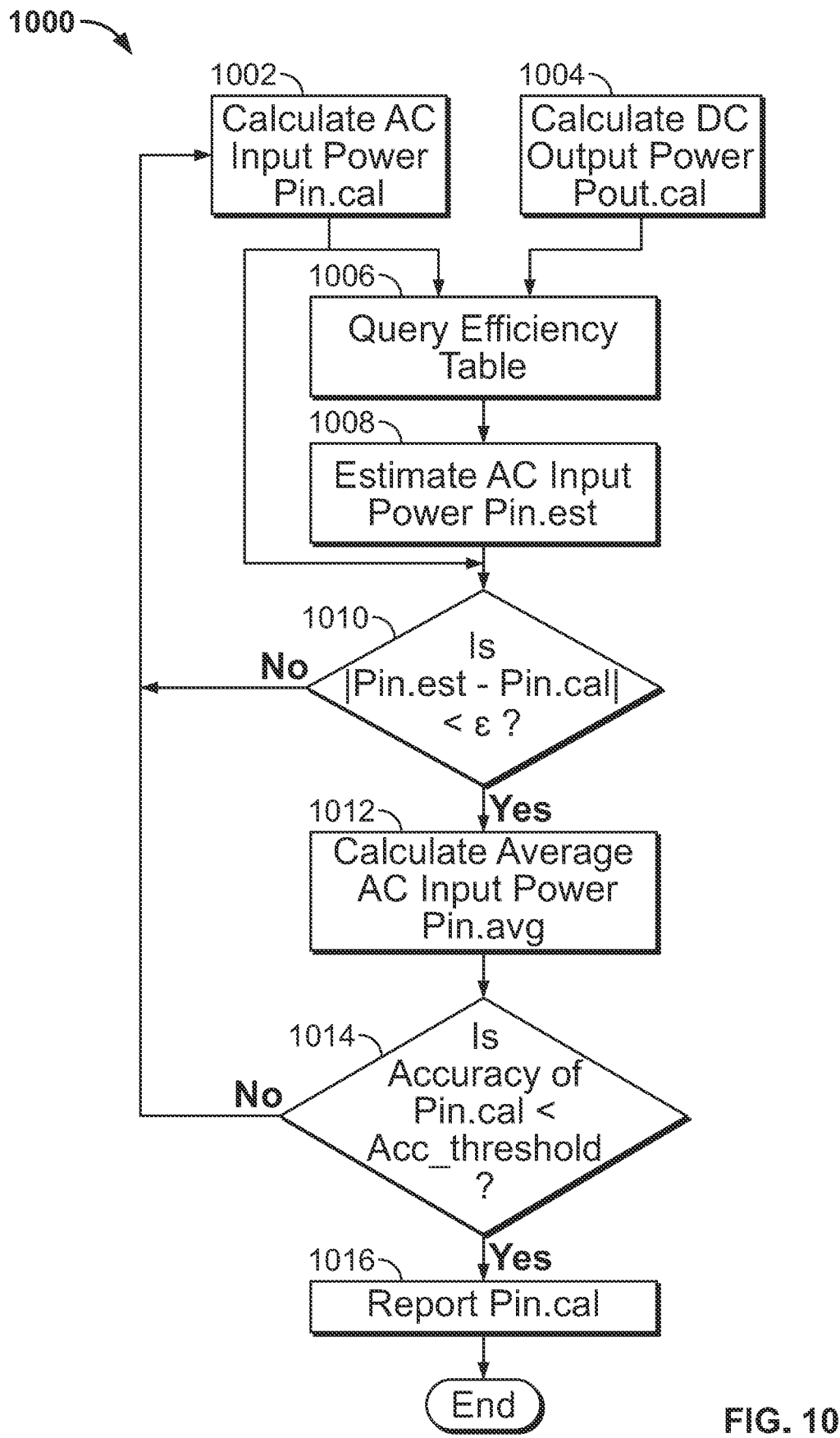
FIG. 10 is a flow diagram of a method for calibrating and reporting an AC input power of a SMPS according to another example embodiment.

As shown in FIG. 10, the method 1000 includes calculating an AC input power Pin.cal of the SMPS in block 1002 and a DC output power Pout.cal of the SMPS in block 1004. For example, the AC input power Pin.cal may be determined based on the calculated AC input current (e.g., an RMS value of the AC input current) and AC input voltage (e.g., an RMS value of the AC input voltage) as explained above relative to equations (3) and (12). In such examples, the calculated AC input current may be based on a reactive current in a filter, a PFC current, a power line frequency, etc. as explained above. The DC output power Pout.cal may be determined based on a sensed output voltage Vout and output current Iout of a DC/DC power converter, as explained above relative to FIG. 8.

Next, the method 1000 includes querying a table in block 1006, and estimating an AC input power Pin.est in block 1008. For example, the table may include various known efficiency curves based on actual measurements. The table may be a lookup table stored in, for example, a control circuit implementing the method 1000. The estimated AC input power Pin.est may be calculated based on the calculated output power Pout.cal (which is typically more accurate than the calculated input power Pin.cal), and the efficiency curves. For example, the estimated AC input power Pin.est may be calculated based on equation (17) below. In equation (17), η represents an efficiency of the SMPS, ηPFC represents an efficiency of the PFC circuit, ηDC/DC represents an efficiency of the DC/DC power converter, etc. at the calculated output power Pout.cal.

$$Pin \cdot est = \frac{Pout.cal}{\eta} = \frac{Pout.cal}{\eta_{PFC} \times \eta_{DC/DC}} \qquad \text{Equation (17)}$$

The method 1000 further includes determining whether a difference ΔPin between the calculated AC input power Pin.cal and the estimated AC input power Pin.est is less than a defined tolerance threshold ε in block 1010. The defined tolerance threshold ε may be any suitable value depending on, for example, the estimated AC input power Pin.est and a desired accuracy of the AC input power Pin.cal. For example, if it is desirable to have an accuracy within a particular value, the defined tolerance threshold E may be equal to the estimated AC input power Pin.est multiplied by the particular value. For instance, if the estimated AC input power Pin.est is 869 W and it is desirable to have an accuracy within 2%, the defined tolerance threshold c may be equal to about 17 W (869 W*2%).

If it is determined that the difference ΔPin between the calculated AC input power Pin.cal and the estimated AC input power Pin.est is greater than or equal to the defined tolerance threshold ε in block 1010, the method 1000 returns to calculating the AC input power Pin.cal of the SMPS in block 1002. In such examples, the AC input power Pin.cal may be recalculated in the attempt to determine a more accurate value of the AC input power Pin.cal. For example, any one of the various parameters used in calculating the AC input power Pin.cal may change. For instance, parameters such as the reactive current, the AC input current, the power line frequency, etc. may be recalculated to determine values that are more accurate. As a result, the AC input current may be determined, and the AC input power Pin.cal may become more accurate. As such, the AC input power Pin.cal may be calibrated (or recalibrated) to obtain a more accurate value.

If it is determined that the difference ΔPin between the calculated AC input power Pin.cal and the estimated AC input power Pin.est is less than the defined tolerance threshold E in block 1010, an average value of the AC input power Pin.avg is calculated in block 1012. In some examples, averaging the value of the AC input power Pin.cal may improve the accuracy. For example, the average value of the AC input power Pin.avg may be calculated based on equation (18) below. In equation (18), N may represent any suitable value including, for example, the number of samples for a number of AC cycles. In some examples, it is desirable to increase the value of N to achieve a more accurate averaged value of the AC input power Pin.cal.

$$Pin.avg = \frac{\sum Pin.cal}{N} \qquad \text{Equation (18)}$$

Next, the method 1000 includes determining whether an accuracy of the calculated AC input power Pin.cal is less than a defined accuracy threshold Acc_threshold in block 1014. This determination may be made based on the averaged AC input power Pin.avg, as shown in equation (19) below.

$$\frac{|Pin.cal - Pin.avg|}{Pin.avg} < Acc_{threshold} \quad \text{Equation (19)}$$

The defined accuracy threshold Acc_threshold may be any suitable value based on, for example, design parameters, etc. In some examples, the defined accuracy threshold Acc_threshold may depend on the load coupled to the SMPS. For example, the defined accuracy threshold Acc_threshold may be 2% for loads ranging between 20-100% load, etc. In other examples, the defined accuracy threshold Acc_threshold may be 5% for lighter loads (e.g., loads ranging between 10-20% load, etc.).

If it is determined that the accuracy of the calculated AC input power Pin.cal is greater than or equal to the defined accuracy threshold in block 1014, the method 1000 returns to calculating (or recalculating) the AC input power Pin.cal of the SMPS in block 1002 in the attempt to determine a more accurate value of the AC input power Pin.cal, as explained above. In such examples, the AC input power Pin.cal may be calibrated (or recalibrated) to obtain a more accurate value. If, however, the determined accuracy of the calculated AC input power Pin.cal is less than the defined accuracy threshold in block 1014, the calculated AC input power Pin.cal may be reported to an external device in block 1016. For example, the calculated AC input power Pin.cal may be reported via a PMBus as explained above.

Figure 11:
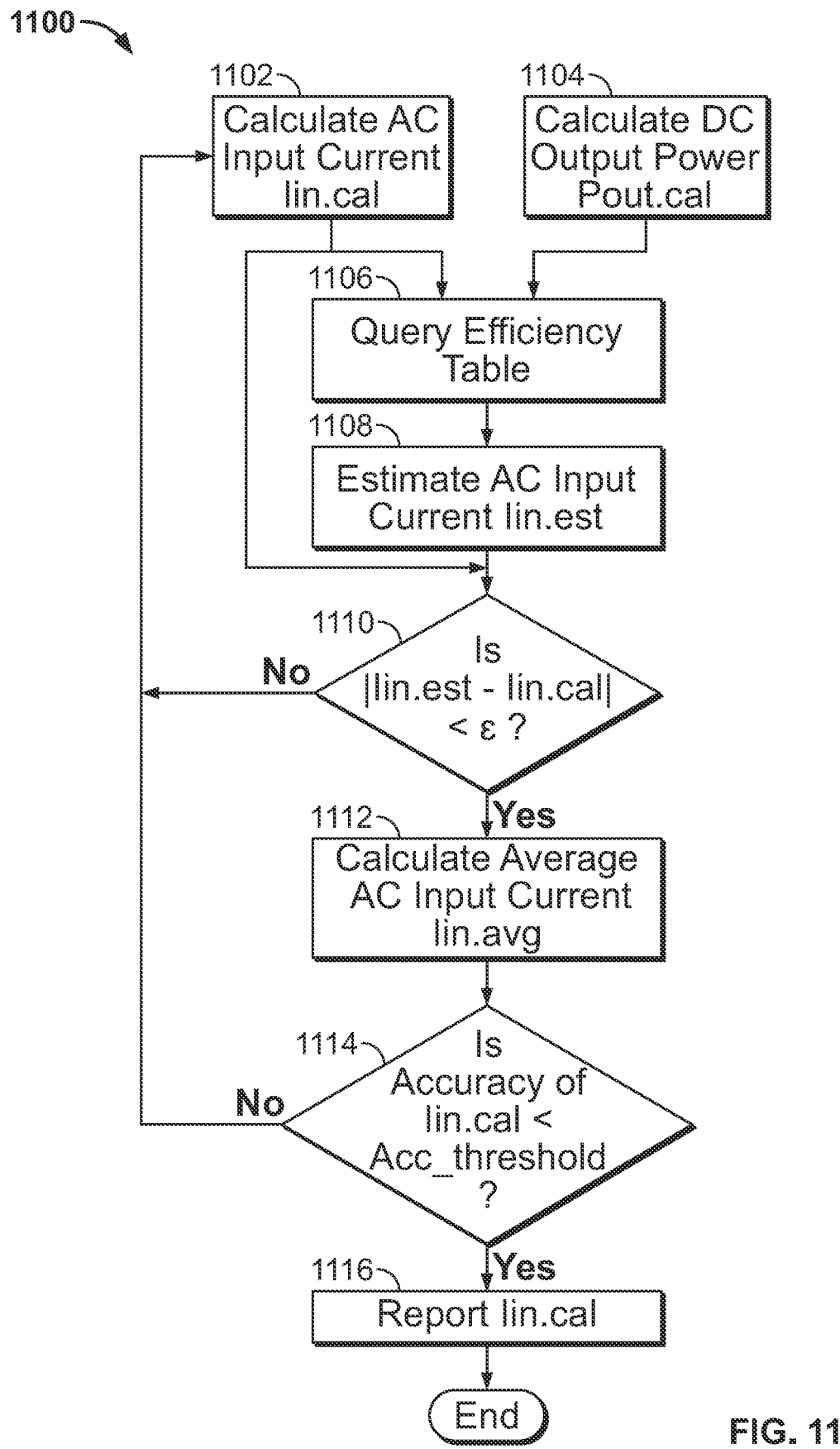
FIG. 11 is a flow diagram of a method for calibrating and reporting an AC input current of a SMPS according to yet another example embodiment.

In other examples, the AC input electrical parameter of FIG. 9 may be the AC input current. For example, FIG. 11 illustrates a method 1100 for calibrating (or recalibrating) and reporting the AC input current of the SMPS. The method 1100 of FIG. 11 is substantially similar to the method 1000 of FIG. 10, but refers to the AC input current.

For example, and as shown in FIG. 11, the method 1100 includes calculating an AC input current Iin.cal of the SMPS in block 1102 and a DC output power Pout.cal of the SMPS in block 1104. The AC input current Iin.cal may be determined based on a reactive current, a PFC current, a power line frequency, etc. as explained above.

The method 1100 then includes querying a table in block 1106, and estimating an AC input current Iin.est in block 1108. As explained above, the table (e.g., a stored lookup table) may include various known efficiency curves based on actual measurements. The estimated AC input current Iin.est in FIG. 11 may be calculated based on the calculated output power Pout.cal, the efficiency curves, and an AC main voltage Vac. For example, the estimated AC input current Iin.est may be calculated based on equation (20) below.

$$Vac \times Iin.ext = Pin.est = \frac{Pout.cal}{\eta} = \frac{Pout.cal}{\eta_{PFC} \times \eta_{DC/DC}} \quad \text{Equation (20)}$$

Next, the method 1100 includes determining whether a difference ΔIin between the calculated AC input current Iin.cal and the estimated AC input current Iin.est is less than a defined tolerance threshold c in block 1110. For example, the defined tolerance threshold c may be determined in a similar manner as explained above relative to the input power's tolerance threshold ε.

If it is determined that the difference ΔIin between the calculated AC input current Iin.cal and the estimated AC input current Iin.est is greater than or equal to the defined tolerance threshold c in block 1110, the method 1100 returns to calculating (or recalculating) the AC input current Iin.cal in block 1102 in the attempt to determine a more accurate value of the AC input current Iin.cal. In such examples, the AC input current Iin.cal may be calibrated (or recalibrated) and/or determined to obtain a more accurate value if more accurate values of the reactive current, the PFC current, the power line frequency, etc. are obtained. If, however, it is determined that the difference ΔIin between the calculated AC input current Iin.cal and the estimated AC input current Iin.est is less than the defined tolerance threshold £ in block 1110, an average value of the AC input current Iin.avg is calculated in block 1112. This may improve the accuracy of the AC input current Iin.cal. For example, the average value of the AC input current Iin.avg may be calculated based on equation (21) below. In equation (21), N may represent the number of samples for a number of AC cycles, as explained above.

$$Iin.avg = \frac{\sum Iin.cal}{N} \quad \text{Equation (21)}$$

The method 1100 further includes determining whether an accuracy of the calculated AC input current Iin.cal is less than a defined accuracy threshold Acc_threshold in block 1114. The defined accuracy threshold Acc_threshold relating to the calculated AC input current Iin.cal may be any suitable value such as 2%, 5%, etc., as explained above relative to the defined accuracy threshold relating to the AC input power. The accuracy of the calculated AC input current Iin.cal is determined based on the averaged AC input power Iin.avg, as shown in equation (22) below.

$$\frac{|Iin.cal - Iin.avg|}{Iin.avg} < Acc_{threshold} \quad \text{Equation (22)}$$

If the accuracy of the calculated AC input current Iin.cal is greater than or equal to the defined accuracy threshold in block 1114, the method 1100 returns to calculating (or recalculating) the AC input current Iin.cal in block 1102 in the attempt to determine a more accurate value of the AC input current Iin.cal (e.g., recalibration), as explained above. If, however, the determined accuracy of the calculated AC input current Iin.cal is less than the defined accuracy threshold in block 1114, the calculated AC input power Iin.cal may be reported to an external device in block 1116 via, for example, a PMBus as explained above.

The methods 900, 1000, 1100 for calibrating (or recalibrating) and/or reporting an AC input electrical parameter may be implemented by any suitable control circuit including, for example, any one of the control circuits disclosed herein. In some examples, some or all portions of the methods may be implemented with one or more of the digital controllers disclosed herein (e.g., the primary side digital controller, the secondary side digital controller, etc.) may be used. Additionally, the methods for calibrating (or recalibrating) and/or reporting an AC input electrical parameter may be implemented in the control circuit in conjunction with the methods for determining an AC input current. In other examples, the methods for recalibrating and/or reporting an AC input electrical parameter (and not the methods for determining an AC input current) may be implemented in the control circuit, or vice-versa.

The control circuits disclosed herein may include an analog control circuit, a digital control circuit, or a hybrid control circuit (e.g., a digital control unit and an analog circuit). The digital control circuits may be implemented with one or more types of digital control circuitry. For example, the digital control circuits each may include a digital controller such as a digital signal controller (DSC), a DSP, a microcontroller unit (MCU), a field-programmable gate array (FPGA), an application-specific IC (ASIC), etc. As such, any one of the control methods disclosed herein may be at least partially (and sometimes entirely) performed by a digital controller.

If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

Portions of the control circuits may be on the secondary side of an isolation barrier if, for example, the corresponding power circuit includes an isolation transformer. In such cases, control signal(s) from the control circuits may cross the isolation barrier (e.g., via one or more isolation devices such as isolation transformers, opto-couplers, etc.) to control power switches on the primary side of the power circuit, as shown in FIG. 8.

In addition, the control methods disclosed herein may be repeated as desired. For example, the control circuits may be able to successively perform the methods as desired and/or if applicable.

The teachings disclosed herein may be applicable in any suitable SMPS having one or more power circuits. In some examples, the teachings may be implemented in at least part of a front-end AC-DC distributed power supply. In such examples, the power supply may receive an AC input voltage ranging between 90-264 VAC at power line frequency ranging between 47-63 Hz, and provide a regulated 12 VDC output or another suitable output voltage. For example, the power supply may have an output power rating of 800 W at 12V/66.7 A, 1800 W at 12V/147.5 A, 2000 W at 12V/163.9 A, 2400 W at 12V/196.7 A, and/or another suitable power rating. In some examples, the power supply may include redundant architectures, and provide a single output. The power supply may be particularly useful in server applications, storage applications (e.g., database applications, cloud hosting applications, etc.), networking applications, etc.

By employing the control methods disclosed herein, an AC main voltage may be developed to include precise zero crossings without a delay that is typically seen in conventional approaches when sampling line and neutral voltages. As a result, an accurate value of the power line frequency may be obtained from the zero crossings, and an accurate input current determination may be achieved based on the power line frequency. In some examples, the AC main voltage may be developed using a single differential amplifier. In such examples, only one port of an ADC in a digital controller (if employed) may be required as compared to multiple ports in conventional approaches.

Additionally, the control methods may provide a solution for measuring input power without relying on power-metering devices (e.g., power meter chips) as in conventional approaches. As a result, costs are reduced, board space is increased, etc. as compared to conventional approaches. Thus, the teachings disclosed herein may provide a low cost, compact SMPS design.

Further, the control methods may provide a solution for calibrating (or recalibrating) input parameters such as an AC input current, input power, etc. to improve accuracy of the parameters. If the accuracy of a parameter is adequate, the parameter may be reported to an external device if desired. The calibrating (or recalibrating) of input parameters may be performed while the SMPS is operating (e.g., on-line). As such, calibrations may be based on real-time calculations.

Also disclosed are the following numbered clauses:

1. A switched mode power supply (SMPS) comprising:
a line rail and a neutral rail;
a filter coupled between the line rail and the neutral rail, the filter including an input for receiving an AC input voltage and an AC input current, an X-capacitance, and an output;
a power factor correction (PFC) circuit coupled to the output of the filter, the PFC circuit including an input for receiving a PFC AC current; and
a control circuit coupled to the PFC circuit, the control circuit configured to generate an analog signal representing a difference between an AC line voltage and an AC neutral voltage, compare the analog signal and a defined threshold to determine zero crossings of the analog signal, determine a frequency of the AC input voltage or the AC input current based on at least two of the zero crossings of the analog signal, determine a reactive current flowing through the X-capacitance in the filter based on the determined frequency, and determine the AC input current of the SMPS based on the determined reactive current and the PFC AC current.

2. The SMPS of any preceding claim wherein the control circuit includes a differential amplifier configured to generate the analog signal.

3. The SMPS of any preceding claim wherein the control circuit includes a digital controller configured to receive the analog signal and determine an input power of the SMPS based on the analog signal and the AC input current.

4. The SMPS of any preceding claim wherein the control circuit includes a comparator configured to compare the analog signal and the defined threshold, and generate a square wave signal having rising edges and falling edges based on the comparison between the analog signal and the defined threshold, and wherein the rising edges or the falling edges correspond to the zero crossings.

5. The SMPS of any preceding claim wherein the control circuit is configured to determine an input power of the SMPS, determine an accuracy of the input power based on an average value of the input power, and report the input power to an external device if the accuracy is less than a defined accuracy threshold.

6. The SMPS of any preceding claim wherein the determined value of the input power is a first determined value of the input power, and wherein the control circuit is configured to determine another value of the input power if the accuracy of the first determined value of the input power is greater than or equal to the defined accuracy threshold.

7. The SMPS of any preceding claim wherein the control circuit is configured to determine an accuracy of the determined AC input current based on an average value of the AC input current, and report the determined AC input current to an external device if the accuracy is less than a defined accuracy threshold.

8. The SMPS of any preceding claim wherein the determined value of the AC input current is a first determined value of the AC input current, and wherein the control circuit is configured to determine another value of the AC input current if the accuracy of the first determined value of the AC input current is greater than or equal to the defined accuracy threshold.

9. A SMPS comprising:
a filter including an input for receiving an AC input current, an X-capacitance, and an output;
a PFC circuit coupled to the output of the filter; and
a control circuit coupled to the PFC circuit, the control circuit configured to determine a value of an AC input electrical parameter of the SMPS, estimate a value of the AC input electrical parameter of the SMPS based on a defined efficiency and an output power of the SMPS, determine an average value of the AC input electrical parameter if a difference between the determined value of the AC input electrical parameter and the estimated value of the AC input electrical parameter is less than a defined tolerance threshold, determine an accuracy of the determined value of the AC input electrical parameter based on the average value of the AC input electrical parameter, and report the determined value of the AC input electrical parameter to an external device if the accuracy of the determined value of the AC input electrical parameter is less than a defined accuracy threshold.

10. The SMPS of any preceding claim wherein the AC input electrical parameter is an AC input current or an AC input power of the SMPS.

11. The SMPS of any preceding claim wherein the control circuit is configured to determine a reactive current in the filter and a PFC current provided to the PFC circuit, and determine the value of the AC input electrical parameter based on the reactive current and the PFC current.

12. The SMPS of any preceding claim wherein the control circuit is configured to determine a frequency of the AC input current, and determine the reactive current based on the frequency of the AC input current.

13. The SMPS of any preceding claim wherein the control circuit is configured to determine the frequency of the AC input current by generating an analog signal representing a difference between an AC line voltage in the SMPS and an AC neutral voltage in the SMPS, comparing the analog signal and a defined threshold to determine zero crossings of the analog signal, and determining the frequency of the AC input current of the SMPS based on the zero crossings of the analog signal.

14. The SMPS of any preceding claim wherein the determined value of the AC input electrical parameter is a first determined value of the AC input electrical parameter, and wherein the control circuit is configured to determine another value of the AC input electrical parameter if the difference between the first determined value of the AC input electrical parameter and the estimated value of the AC input electrical parameter is greater than or equal to the defined tolerance threshold.

15. The SMPS of any preceding claim wherein the determined value of the AC input electrical parameter is a first determined value of the AC input electrical parameter, and wherein the control circuit is configured to determine another value of the AC input electrical parameter if the accuracy of the first determined value of the AC input electrical parameter is greater than or equal to the defined accuracy threshold.

16. A SMPS comprising:
a line rail and a neutral rail;
a filter coupled between the line rail and the neutral rail, the filter including an input for receiving an AC input voltage and an AC input current;
a PFC circuit coupled to the output of the filter; and
a control circuit including a differential amplifier and a digital controller, the differential amplifier configured to generate an analog signal representing a difference between an AC line voltage and an AC neutral voltage, and the digital controller configured to determine the AC input voltage and a frequency of the AC input voltage or the AC input current based on the analog signal.

17. The SMPS of any preceding claim wherein the control circuit includes a comparator coupled between the differential amplifier and the digital controller, wherein the comparator is configured to compare the analog signal and a defined threshold to determine zero crossings of the analog signal, and wherein the digital controller is configured to determine the frequency of the AC input voltage or the AC input current based on at least two of the zero crossings of the analog signal.

18. The SMPS of any preceding claim wherein the comparator is configured to generate a square wave signal having rising edges and falling edges based on the comparison between the analog signal and the defined threshold, and wherein the rising edges or the falling edges correspond to the zero crossings.

19. The SMPS of any preceding claim wherein the at least two of the zero crossings of the analog signal are two consecutive zero crossings of the analog signal.

20. The SMPS of any preceding claim wherein the filter includes an X-capacitance, and wherein the digital controller is configured to determine a reactive current flowing through the X-capacitance based on the determined frequency.

21. The SMPS of any preceding claim wherein the PFC circuit includes an input for receiving a PFC AC current, and wherein the digital controller is configured to determine the AC input current based on the determined reactive current and the PFC AC current.

22. The SMPS of any preceding claim wherein the digital controller is configured to determine an accuracy of the determined AC input current based on an average value of the AC input current, and report the determined AC input current to an external device if the accuracy is less than a defined accuracy threshold.

23. The SMPS of any preceding claim wherein the determined value of the AC input current is a first determined value of the AC input current, and wherein the control circuit is configured to determine another value of the AC input current if the accuracy of the first determined value of the AC input current is greater than or equal to the defined accuracy threshold.

24. The SMPS of any preceding claim wherein the digital controller is configured to receive the analog signal and determine an input power of the SMPS based on the determined AC input voltage signal and the determined AC input current.

25. The SMPS of any preceding claim wherein the digital controller is configured to determine an accuracy of the input power based on an average value of the input power, and report the input power to an external device if the accuracy is less than a defined accuracy threshold.

26. The SMPS of any preceding claim wherein the determined value of the input power is a first determined value of the input power, and wherein the control circuit is configured to determine another value of the input power if the accuracy of the first determined value of the input power is greater than or equal to the defined accuracy threshold.

27. A SMPS comprising:
a line rail and a neutral rail;
a filter coupled between the line rail and the neutral rail, the filter including an input for receiving an AC input voltage and an AC input current, an X-capacitance, and an output;
a PFC circuit coupled to the output of the filter, the PFC circuit including an input for receiving a PFC AC current, at least one power switch, and an output;
a DC/DC power circuit coupled to the output of the PFC circuit, the DC/DC power circuit including at least one power switch and a transformer; and
a control circuit coupled to the PFC circuit for controlling the at least one power switch of the PFC circuit and to the DC/DC power circuit for controlling the at least one power switch of the DC/DC power circuit, the control circuit including at least one differential amplifier, a primary side digital controller, a secondary side digital controller, and an isolation device coupled between the primary side digital controller and the secondary side digital controller, the differential amplifier configured to generate an analog signal representing a difference between an AC line voltage and an AC neutral voltage, and the primary side digital controller configured to determine the AC input voltage based on the analog signal, determine a frequency of the AC input voltage or the AC input current based on the analog signal, determine a reactive current flowing through the X-capacitance based on the determined frequency, and determine the AC input current based on the determined reactive current and the PFC AC current.

28. The SMPS of any preceding claim wherein the control circuit includes a comparator coupled between the differential amplifier and the primary side digital controller, wherein the comparator is configured to compare the analog signal and a defined threshold to determine zero crossings of the analog signal, and wherein the primary side digital controller is configured to determine the frequency of the AC input voltage or the AC input current based on at least two of the zero crossings of the analog signal.

29. The SMPS of any preceding claim wherein the comparator is configured to generate a square wave signal having rising edges and falling edges based on the comparison between the analog signal and the defined threshold, and wherein the rising edges or the falling edges correspond to the zero crossings.

30. The SMPS of any preceding claim wherein the at least two of the zero crossings of the analog signal are two consecutive zero crossings of the analog signal.

31. The SMPS of any preceding claim wherein the primary side digital controller is configured to determine the AC input current based on the determined reactive current and the PFC AC current.

32. The SMPS of any preceding claim wherein the primary side digital controller is configured to determine an accuracy of the determined AC input current based on an average value of the AC input current, and wherein the secondary side digital controller is configured to report the determined AC input current to an external device if the accuracy is less than a defined accuracy threshold.

33. The SMPS of any preceding claim wherein the determined value of the AC input current is a first determined value of the AC input current, and wherein the primary side digital controller is configured to determine another value of the AC input current if the accuracy of the first determined value of the AC input current is greater than or equal to the defined accuracy threshold.

34. The SMPS of any preceding claim wherein the primary side digital controller is configured to receive the analog signal and determine an input power of the SMPS based on the determined AC input voltage signal and the determined AC input current.

35. The SMPS of any preceding claim wherein the primary side digital controller is configured to determine an input power of the SMPS, and determine an accuracy of the input power based on an average value of the input power, and wherein the secondary side digital controller is configured to report the input power to an external device if the accuracy is less than a defined accuracy threshold.

36. The SMPS of any preceding claim wherein the determined value of the input power is a first determined value of the input power, and wherein the primary side digital controller is configured to determine another value of the input power if the accuracy of the first determined value of the input power is greater than or equal to the defined accuracy threshold.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. A switched mode power supply (SMPS) comprising:
an AC input configured to receive an AC input voltage and an AC input current;
a filter coupled to the AC input;
a power factor correction (PFC) circuit coupled to the filter and configured to receive a PFC AC current from the filter; and
a control circuit coupled to the AC input and to the PFC circuit and configured to:
determine a reactive current flowing through the filter and not provided to the PFC circuit;
determine the PFC AC current; and
determine the AC input current based on the determined reactive current and the determined PFC AC current.

2. The SMPS of claim 1, wherein the control circuit, in being configured to determine the reactive current, is configured to:
generate an analog signal representing a difference between an AC line voltage and an AC neutral voltage;
compare the analog signal and a defined threshold to determine zero crossings of the analog signal;
determine a frequency of the AC input voltage or the AC input current based on at least two of the zero crossings of the analog signal; and
determine the reactive current based on the determined frequency.

3. The SMPS of claim 2, wherein the at least two of the zero crossings of the analog signal are two consecutive zero crossings of the analog signal.

4. The SMPS of claim 2, wherein the control circuit includes a differential amplifier configured to generate the analog signal.

5. The SMPS of claim 2, wherein the control circuit includes a digital controller configured to:
receive the analog signal; and
determine an input power of the SMPS based on the analog signal and the AC input current.

6. The SMPS of claim 5, wherein the digital controller is further configured to:
determine an accuracy of the determined AC input current based on an average value of the AC input current; and
report the determined AC input current to an external device if the accuracy is less than a defined accuracy threshold.

7. The SMPS of claim 6, wherein the determined value of the AC input current is a first determined value of the AC input current; and
wherein the control circuit is further configured to determine another value of the AC input current if the accuracy of the first determined value of the AC input current is greater than or equal to the defined accuracy threshold.

8. The SMPS of claim 5, wherein the digital controller is further configured to:
receive the analog signal;
determine the AC input voltage based on the analog signal; and
determine an input power of the SMPS based on the determined AC input voltage signal and the determined AC input current.

9. The SMPS of claim 8, wherein the digital controller is further configured to:
determine an accuracy of the input power based on an average value of the input power; and
report the input power to an external device if the accuracy is less than a defined accuracy threshold.

10. The SMPS of claim 9, wherein a value of the determined input power is a first determined value of the input power; and
further comprising determining another value of the input power if the accuracy of the first determined value of the input power is greater than or equal to the defined accuracy threshold.

11. The SMPS of claim 2, wherein the control circuit includes a comparator configured to:
compare the analog signal and the defined threshold; and
generate a square wave signal having rising edges and falling edges based on the comparison between the analog signal and the defined threshold;
wherein the rising edges or the falling edges correspond to the zero crossings.

12. The SMPS of claim 1, wherein the PFC circuit comprises a shunt resistor; and
wherein the control circuit includes a differential amplifier configured to amplify a voltage drop signal across the shunt resistor.

13. The SMPS of claim 12, wherein the control circuit comprises an analog-to-digital converter (ADC) configured to sample the amplified voltage drop signal; and
wherein the control circuit is further configured to determine the PFC AC current based on the sampled amplified voltage drop signal.

14. A method for determining an AC input current provided to a switched mode power supply (SMPS) comprising:
receiving the AC input current and an AC input voltage at an AC input of the SMPS;
filtering the AC input current;
providing the filtered AC input current to a power factor correction (PFC) circuit;
determining a reactive current removed from the AC input current to generate the filtered AC input current;
determining the filtered AC input current; and
determining the AC input current based on the determined reactive current and the determined filtered AC input current.

15. The method of claim 14, wherein determining the reactive current comprises:
generating an analog signal representing a difference between an AC line voltage and an AC neutral voltage;
comparing the analog signal and a defined threshold;
determining zero crossings of the analog signal based on the comparison;
determining a frequency of the AC input voltage or the AC input current based on at least two of the zero crossings of the analog signal; and
determining the reactive current based on the determined frequency.

16. The method of claim 15, wherein generating the analog signal comprises generating the analog signal via a differential amplifier.

17. The method of claim 15 further comprising:
receiving the analog signal via a digital controller; and
determining an input power of the SMPS based on the analog signal and the determined AC input current.

18. The method of claim 15 further comprising:
comparing the analog signal and the defined threshold; and
generating a square wave signal having rising edges and falling edges based on the comparison between the analog signal and the defined threshold;
wherein the rising edges or the falling edges correspond to the zero crossings.

19. The method of claim 14 further comprising:
generating a measured signal via measuring a voltage drop signal across a shunt resistor; and
generating an amplified signal via amplifying the measured signal.

20. The method of claim 19 further comprising:
generating a sampled signal via sampling, via an analog-to-digital converter (ADC), the amplified signal; and
determining the PFC AC current based on the sampled signal.

* * * * *